United States Patent
Wang et al.

(10) Patent No.: US 7,849,742 B2
(45) Date of Patent: Dec. 14, 2010

(54) OUT-OF-PLANE SENSING DEVICE

(75) Inventors: Chuanwei Wang, Science-Based Industrial Park Hsin-Chu (TW); Ming Han Tsai, Science-Based Industrial Park Hsin-Chu (TW); Chih Ming Sun, Science-Based Industrial Park Hsin-Chu (TW); Weileun Fang, Science-Based Industrial Park Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 79 days.

(21) Appl. No.: 11/944,291

(22) Filed: Nov. 21, 2007

(65) Prior Publication Data

US 2009/0090184 A1 Apr. 9, 2009

(30) Foreign Application Priority Data

Oct. 5, 2007 (TW) .............................. 96137391 A

(51) Int. Cl.
*G01P 15/125* (2006.01)
(52) U.S. Cl. .................................. 73/514.32; 73/514.38
(58) Field of Classification Search .............. 73/514.17, 73/514.18, 514.32, 514.36, 514.38, 504.04, 73/504.12, 504.14
See application file for complete search history.

(56) References Cited

U.S. PATENT DOCUMENTS

| | | | | |
|---|---|---|---|---|
| 5,939,633 A * | 8/1999 | Judy | ....................... | 73/514.32 |
| 6,082,197 A * | 7/2000 | Mizuno et al. | ........... | 73/514.36 |
| 6,122,964 A * | 9/2000 | Mohaupt et al. | ......... | 73/514.32 |
| 6,223,598 B1 * | 5/2001 | Judy | ....................... | 73/514.32 |
| 6,508,125 B2 * | 1/2003 | Otani | ...................... | 73/514.32 |
| 6,662,654 B2 | 12/2003 | Miao et al. | | |
| 6,892,576 B2 * | 5/2005 | Samuels et al. | .......... | 73/514.32 |
| 6,906,849 B1 * | 6/2005 | Mi et al. | ..................... | 359/291 |
| 6,915,693 B2 * | 7/2005 | Kim et al. | ................ | 73/504.12 |
| 6,936,492 B2 | 8/2005 | McNeil et al. | | |
| 6,990,864 B2 * | 1/2006 | Sakai | ...................... | 73/514.32 |
| 7,258,012 B2 * | 8/2007 | Xie | ......................... | 73/514.32 |
| 7,355,318 B2 * | 4/2008 | Dean et al. | .................. | 310/309 |
| 7,412,887 B2 * | 8/2008 | Memishian | .............. | 73/514.32 |
| 7,600,428 B2 * | 10/2009 | Robert et al. | ............ | 73/514.32 |

OTHER PUBLICATIONS

Chuanwei Wang, "A novel CMOS out-of-plane accelerometer with fully differential gap-closing capacitance sensing electrodes", Journal of Micromechanics and Microengineering, pp. 1-6, 2007.

* cited by examiner

*Primary Examiner*—Helen C. Kwok

(57) ABSTRACT

An out-of-plane sensing device is provided. A proof mass is movable with respect to a substrate. A frame is positioned on the substrate and encloses the proof mass. At least one spring connects the proof mass to the frame so that the spring will exert a force on the proof mass to make the proof mass move back to its equilibrium position when the proof mass moves perpendicularly to the substrate. An electrode extends from the proof mass toward the frame. A counter electrode extends from the frame toward the proof mass, wherein the projection of the electrode onto the substrate overlaps with that of the counter electrode onto the substrate.

20 Claims, 5 Drawing Sheets

OUT-OF-PLANE SENSING DEVICE

CROSS REFERENCE TO RELATED APPLICATION

This application claims the priority benefit of Taiwan Patent Application Serial Number 096137391 filed Oct. 5, 2007, the full disclosure of which is incorporated herein by reference.

BACKGROUND OF THE INVENTION

1. Field of the Invention

The invention relates to a sensing device, and more particularly, to an out-of-plane sensing device.

2. Description of the Related Art

Complementary metal oxide semiconductor (CMOS) has become the predominant technology in digital integrated circuits. This is essentially because area occupation, operating speed, energy efficiency and manufacturing costs have benefited and continue to benefit from the geometric downsizing that comes with every new generation of semiconductor manufacturing processes. In addition, the simplicity and comparatively low power dissipation of CMOS circuits have allowed for integration densities.

Microfabrication, also known as micromachining, commonly refers to the use of known semiconductor processing techniques to fabricate devices known as micro-electromechanical systems (MEMS) or micromachined devices. In general, known MEMS fabrication processes involve the sequential addition and removal of layers of material from a substrate layer through the use of film deposition and etching techniques until the desired structure has been realized. Accordingly, MEMS devices typically function under the same principles as their macroscale counterparts. MEMS devices, however, offer advantages in design, performance, and cost in comparison to their macroscale counterparts due to the decrease in scale of MEMS devices. In addition, due to batch fabrication techniques applicable to MEMS technology, significant reductions in per unit cost may be realized.

CMOS-MEMS is a technology that uses standard semiconductor process to fabricate a chip with an integration of mechanical structure and circuitry. The advantage of such technology is that the resulting chip has a stable and precise line pitch and can be fabricated in batch. Therefore, semiconductor industry has made great effort in the development of CMOS-MEMS components.

According to standard CMOS process for fabricating MEMS devices, the COMS-MEMS process can be classified into three sub-processes, i.e. pre-CMOS process, intermediate-CMOS and post-CMOS process.

According to the pre-CMOS process, a MEMS structure is first defined. An etching stop layer is then used to protect the standard CMOS components. The advantage of such design is that the CMOS components can be free from the influence of temperature and etching during the formation of the MEMS structure. A typical process is that polysilicon is first deposited to form the MEMS structure and a layer of silicon oxide is then used to cover the CMOS components. Afterward, the layer of silicon oxide is ground flush with the technique of chemical mechanical polish (CMP). After the layer of silicon oxide is ground flush, a second stage of CMOS process is performed to fabricate circuit components. Finally, the silicon oxide is etched to release elements to form the monolithic integration of the IC and MEMS components.

According to the intermediate-CMOS process, the original process parameters are varied or the original standard CMOS process is modified to add layers of material to form the desired microstructure. However, the COMS foundries usually do not allow their clients to change the process parameters. Therefore, only those with their own foundries can change the process parameters at their own choice.

According to the post-CMOS process, the structure and CMOS process are achieved simultaneously. After the CMOS process is achieved, the MEMS structure is suspended. Alternatively, the related component processes such as electroplating or etching can be carried out after the CMOS process.

In general, the conventional post CMOS-MEMS process can only achieve vertical etching and fails to etch out a horizontal channel as the gap between the upper and lower electrodes. Therefore, most of the existing capacitor-based in-plane micromachined accelerometers are fabricated with the conventional CMOS-MEMS process. However, such accelerometers of parallel vertical comb sensing electrodes can only induce a small variation of the capacitance between the electrodes and also have high residual stress. This will cause the existing micromachined accelerometers to have poor performance.

Besides, some scholars have proposed that the out-of-plane acceleration can be sensed by an unbalanced proof mass. The principle of the invention is that when the accelerometer is subjected to an out-of-plane acceleration, the unbalanced proof mass will rotate to cause a variation of voltage. The voltage variation is used to determine the out-of-plane acceleration. The method for fabricating such out-of-plane accelerometer is first to use two mask steps to define a block for anodes on the glass substrate and space for moveable elements to move about. Afterward, a further mask step is used to define and etch a structure on the silicon wafer. Finally, the silicon substrate is bonded with glass anodes to form the desired structure. This structure is easy to be fabricated and has an advantage of larger thickness that can generate larger responsive signals. However, this structure can only sense capacitance variation of single capacitor or implement a differential capacitance sensing. It will be very hard to cope with noise for such structure. Therefore, the sensitivity of the accelerometer is very susceptible to temperature and the accelerometer will have a poor resolution.

Furthermore, some scholars have also proposed an out-of-plane accelerometer fabricated by surface process and bulk process. The method is first to use trench refill process to form a sacrifice layer for electrode gap. The silicon wafer is then subjected to a bulk etching process to fully suspend the proof mass. Finally, the sacrifice layer is removed to form the accelerometer. The advantage of such accelerometer is that the use of the trench refill process can obtain a very small electrode gap and the small electrode gap can increase the variation of capacitance between electrodes and hence the sensitivity of the accelerometer. Besides, since the entire thickness of the silicon substrate is used to form the proof mass, the proof mass will exert a greater force on other components for a given acceleration. The force exerted by the proof mass will make the components to have a greater displacement and therefore the signal of variation. However, the structure of such accelerometer is hard to fabricate. The thickness of the sacrifice layer formed by trench refill process is hard to control and therefore the measurement range is not enough. The sacrifice layer is also prone to sticking to the substrate and therefore hard to be removed.

Presently, more accelerometers have been employed in the hard disks of laptop computers to detect the vibration experienced by the hard disks. When the hard disks experience a great vibration, their pickup heads will move out of the planes of the hard disks to avoid scratch the surfaces of the hard disks. Besides, the accelerometers have also been employed in video game sets. Especially, some of video games are played with multi-axes accelerometers to increase the fun and excitement of the games. Some of the cell phones are also equipped with accelerometers to enable users to play some special games.

Accordingly, there exists a need to provide an out-of-plane sensing device to solve the above-mentioned problems.

SUMMARY OF THE INVENTION

It is an object of the present invention to provide an out-of-plane sensing device that can measure the acceleration perpendicular to the substrate.

In order to achieve the above object, the out-of-plane sensing device of the present invention includes a substrate, a substantially rectangular proof mass and at least one spring. A substantially rectangular frame is positioned on the substrate and encloses a receiving space. The proof mass is positioned in the receiving space and movable perpendicular to the substrate. The spring connects the proof mass to the frame so that the spring will exert a force on the proof mass to make the proof mass move back to its equilibrium position when the proof mass moves perpendicularly to the substrate as a result of subjection to an external force. In order to measure the acceleration, electrodes extend away from two longitudinal sides of the proof mass toward two longitudinal sides of the frame, respectively. Besides, counter electrodes extend away from the two longitudinal sides of the frame toward the two longitudinal sides of the proof mass, respectively. In order to enhance the sensitivity of the sensing device, the electrodes extend away from two transverse sides of the proof mass toward two transverse sides of the frame, respectively. Moreover, counter electrodes extend away from the two transverse sides of the frame toward the two transverse sides of the proof mass, respectively. The projections of the electrodes onto the substrate overlap with the projections of their counter electrodes onto the substrate, respectively. In operation, when the sensing device of the present invention is accelerated to cause the proof mass to move perpendicularly to the substrate, the electrodes will move relative to their respective counter electrodes thereby varying the distance, and hence the capacitance between the electrodes and their respective counter electrodes. The variation of the capacitance between the electrodes and their respective counter electrodes can be used to determine the acceleration of the sensing device perpendicular to the substrate.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 1b is a locally enlarged view of the out-of-plane sensing device of FIG. 1a.

DETAILED DESCRIPTION OF THE PREFERRED EMBODIMENT

Figure 1A:
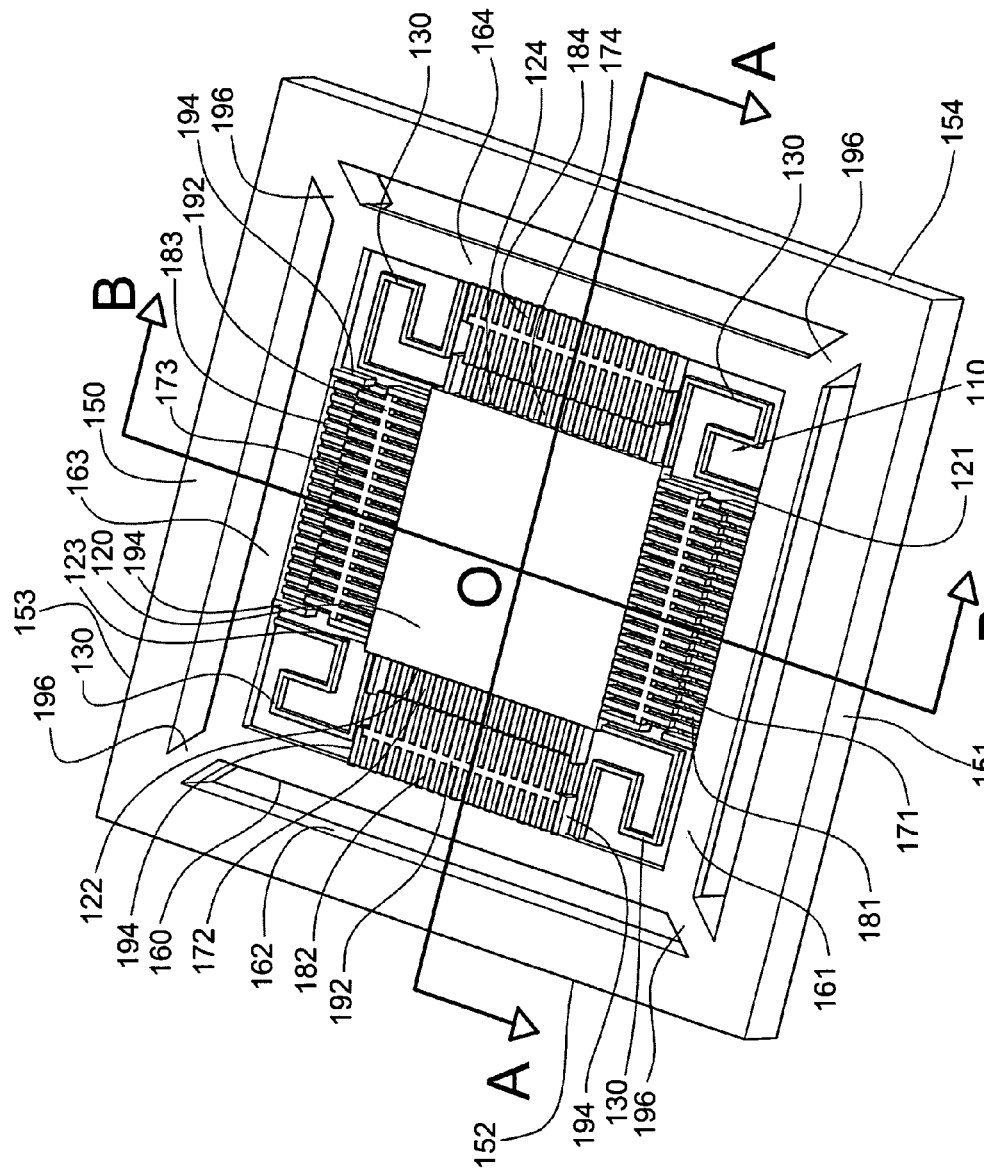
FIG. 1a is a perspective view of the out-of-plane sensing device according to the first embodiment of the present invention.
Figure 1B:
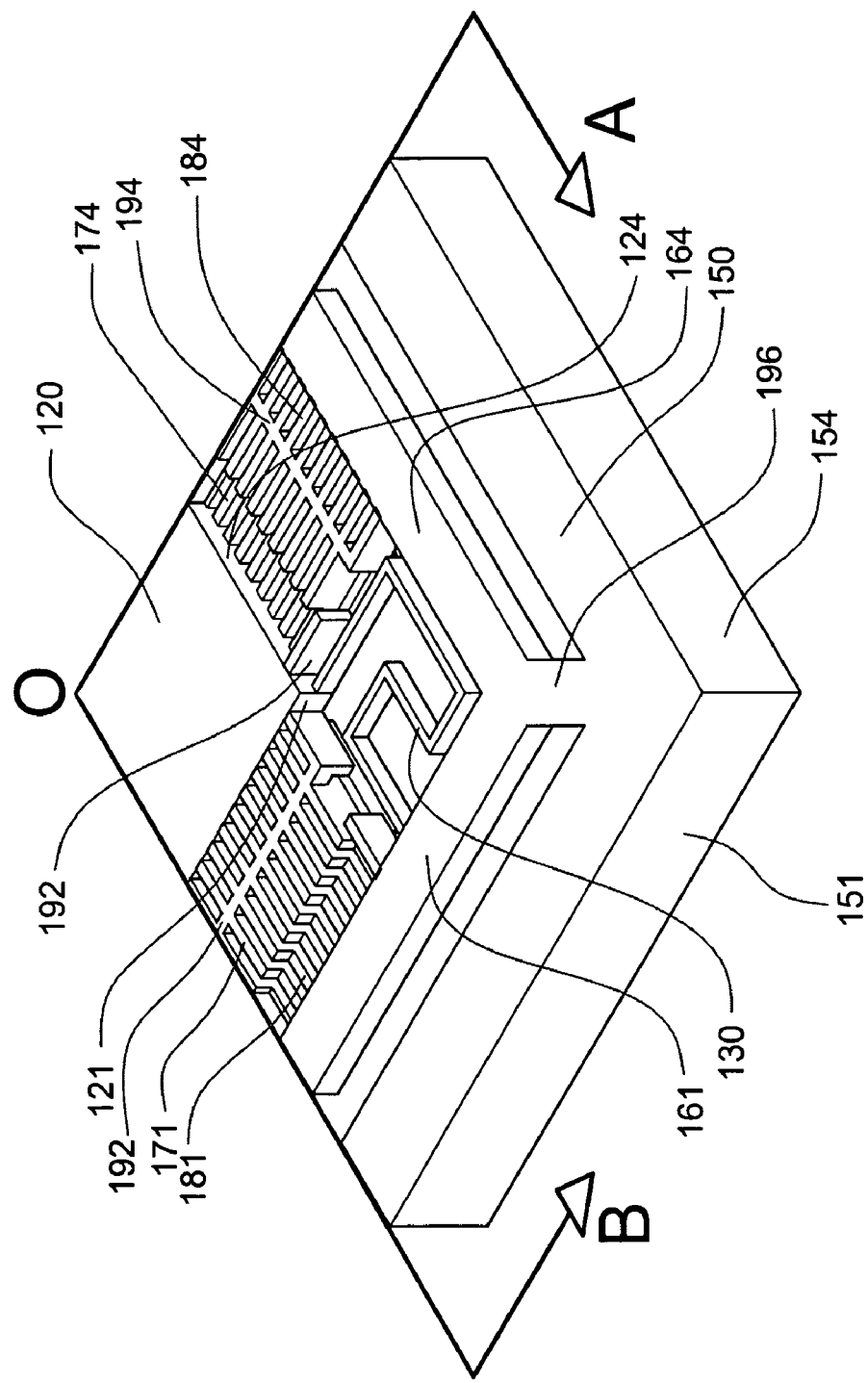

Referring to FIGS. 1a and 1b, where section lines A-A and B-B are taken for illustrating the out-of-plane sensing device 100 of the present invention and the point O is the intersection of the lines A-A and B-B. The out-of-plane sensing device 100 according to the first embodiment of the present invention includes a substrate 150, a substantially rectangular proof mass 120 and at least one spring 130. A substantially rectangular frame 160 is positioned on the substrate 150 and encloses a receiving space 110. The proof mass 120 is positioned in the receiving space 110 and movable perpendicular to the substrate 150, i.e. toward or away from the substrate 150 along the normal line of the substrate 150. The spring 130 connects the proof mass 120 to the frame 160 so that the spring 130 will exert a force on the proof mass 120 to make the proof mass 120 move back to its equilibrium position when the proof mass 120 moves perpendicularly to the substrate 150 as a result of subjection to an external force.

In order to measure the acceleration of the sensing device 100, an electrode 171 extends away from one longitudinal side 121 of the proof mass 120 toward one longitudinal side 161 of the frame 160. An electrode 173 extends away from the other longitudinal side 123 of the proof mass 120 toward the other longitudinal side 163 of the frame 160. The electrodes 171 and 173 are parallel to the substrate 150. A counter electrode 181 extends away from the side 161 of the frame 160 toward the side 121 of the proof mass 120. A counter electrode 183 extends away from the side 163 of the frame 160 toward the side 123 of the proof mass 120. The counter 181 and 183 are parallel to the substrate 150. The projection of the electrode 171 onto the substrate 150 overlaps with that of the counter electrode 181 onto the substrate 150 and the projection of the electrode 173 onto the substrate 150 overlaps with that of the counter electrode 183 onto the substrate 150. In operation, when the sensing device 100 is accelerated to cause the proof mass 120 to move perpendicularly to the substrate 150, the electrodes 171 and 173 will move relative to their respective counter electrodes 181 and 183 thereby varying the distance, and hence the capacitance between the electrodes 171, 173 and their respective counter electrodes 181, 183. The variation of the capacitance between the electrodes 171, 173 and their respective counter electrodes 181, 183 can be used to determine the acceleration of the sensing device 100 perpendicular to the substrate 150.

In order to enhance the sensitivity of the sensing device 100, an electrode 172 extends away from one transverse side 122 of the proof mass 120 toward one transverse side 162 of the frame 160. An electrode 174 extends away from the other transverse side 124 of the proof mass 120 toward the other transverse side 164 of the frame 160. The electrodes 172 and 174 are parallel to the substrate 150. A counter electrode 182 extends away from the side 162 of the frame 160 toward the side 122 of the proof mass 120. A counter electrode 184 extends away from the side 164 of the frame 160 toward the side 124 of the proof mass 120. The counter 182 and 184 are parallel to the substrate 150. The projection of the electrode 172 onto the substrate 150 overlaps with that of the counter electrode 182 onto the substrate 150 and the projection of the electrode 174 onto the substrate 150 overlaps with that of the counter electrode 184 onto the substrate 150. Similarly, when the sensing device 100 is accelerated to cause the proof mass 120 to move perpendicular to the substrate 150, the electrodes 172 and 174 will move relative to their respective counter electrodes 182 and 184 thereby varying the distance, and hence the capacitance between the electrodes 172, 174 and their respective counter electrodes 182, 184. The variation of the capacitance between the electrodes 172, 174 and their respective counter electrodes 182, 184 can also be used to determine the acceleration of the sensing device 100 perpendicular to the substrate 150. In the preferred embodiment of the present invention, the distances from the electrodes 171, 173 to the substrate 150 are respectively greater than the distances from the counter electrodes 181, 183 to the substrate 150 while the distances from the electrodes 172, 174 to the substrate 150 are respectively smaller than the distances from the counter electrodes 182, 184 to the substrate 150. In this way, when the proof mass 120 moves toward the substrate 150 to cause the distances between the electrodes 171, 173 and their respective counter electrodes 181, 183 to be decreased, the distances between the electrodes 172, 174 and their respective counter electrodes 182, 184 will be increased. Similarly, when the proof mass 120 moves away from the substrate 150 to cause the distances between the electrodes 171, 173 and their respective counter electrodes 181, 183 to be increased, the distances between the electrodes 172, 174 and their respective counter electrodes 182, 184 will be decreased. Such design is so-called fully differential capacitive sensing electrodes and can increase the sensitivity of the sensing device 100.

Furthermore, since the electrodes of great area are difficult to form by etching, the electrodes 171, 172, 173, 174, 181, 182, 183 and 184 preferably are comb-like electrodes. More specifically, each of the electrodes 171, 172, 173, 174, 181, 182, 183 and 184 includes a plurality of smaller-area electrodes which are spaced from each other at a predetermined gap. Because the comb-like electrodes 171, 172, 173, 174, 181, 182, 183 and 184 are more prone to warpage due to residual stress, the smaller-area electrodes of each of the comb-like electrodes 171, 172, 173, 174, 181, 182, 183 and 184 are connected to each other by an arm 192 and both ends of the arm 192 are connected to reinforced ribs 194 to prevent the comb-like electrodes 171, 172, 173, 174, 181, 182, 183 and 184 from bending by residual stress. The out-of-plane sensing device 100 preferably includes four springs 130, wherein the first of the four springs 130 is connected between the longitudinal side 161 of the frame 160 and the longitudinal side 121 of the proof mass 120, the second of the four springs 130 is connected between the transverse side 162 of the frame 160 and the transverse side 122 of the proof mass 120, the third of the four springs 130 is connected between the longitudinal side 163 of the frame 160 and the longitudinal side 123 of the proof mass 120, and the fourth of the four springs 130 is connected between the transverse side 164 of the frame 160 and the transverse side 124 of the proof mass 120. The four springs 130 together can exert symmetric restoring force on the proof mass 120 to prevent it from rotation when the proof mass 120 moves away from its equilibrium position as a result of external force. To prevent the substrate 150 100 from warpage, the frame 160 is designed to have a rectangular shape. In addition, four anchors 196 are connected to the four corners of the rectangular frame 160 respectively and are rigidly coupled to the substrate 150 to reduce the warpage of the frame 160 resulted from residual stress.

Figure 2:
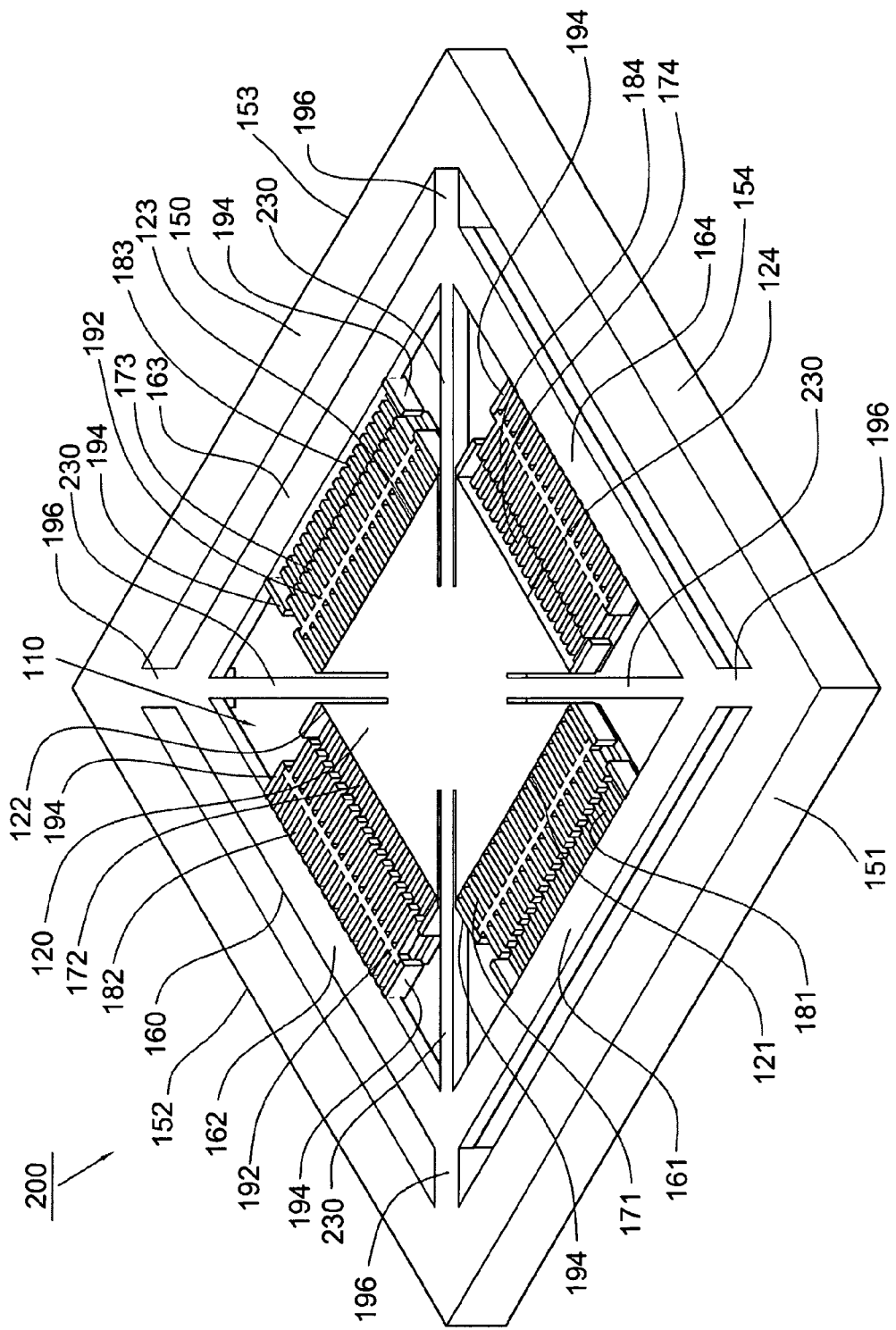
FIG. 2 is a perspective view of the out-of-plane sensing device according to the second embodiment of the present invention.

Referring to FIG. 2, the out-of-plane sensing device 200 according to the second embodiment of the present invention is shown, where identical reference numbers have been used when designating substantially identical elements that are common to the figures. Thus, any further illustrations of the identical elements are omitted herein. The out-of-plane sensing device 200 is substantially identical to the out-of-plane sensing device 100 and the differences between them are in that the springs 230 of the sensing device 200 are linear springs and each of the linear springs 230 is connected between one of the four corners of the rectangular frame 160 and one of the four corners of the substantially rectangular proof mass 120.

Figure 3:
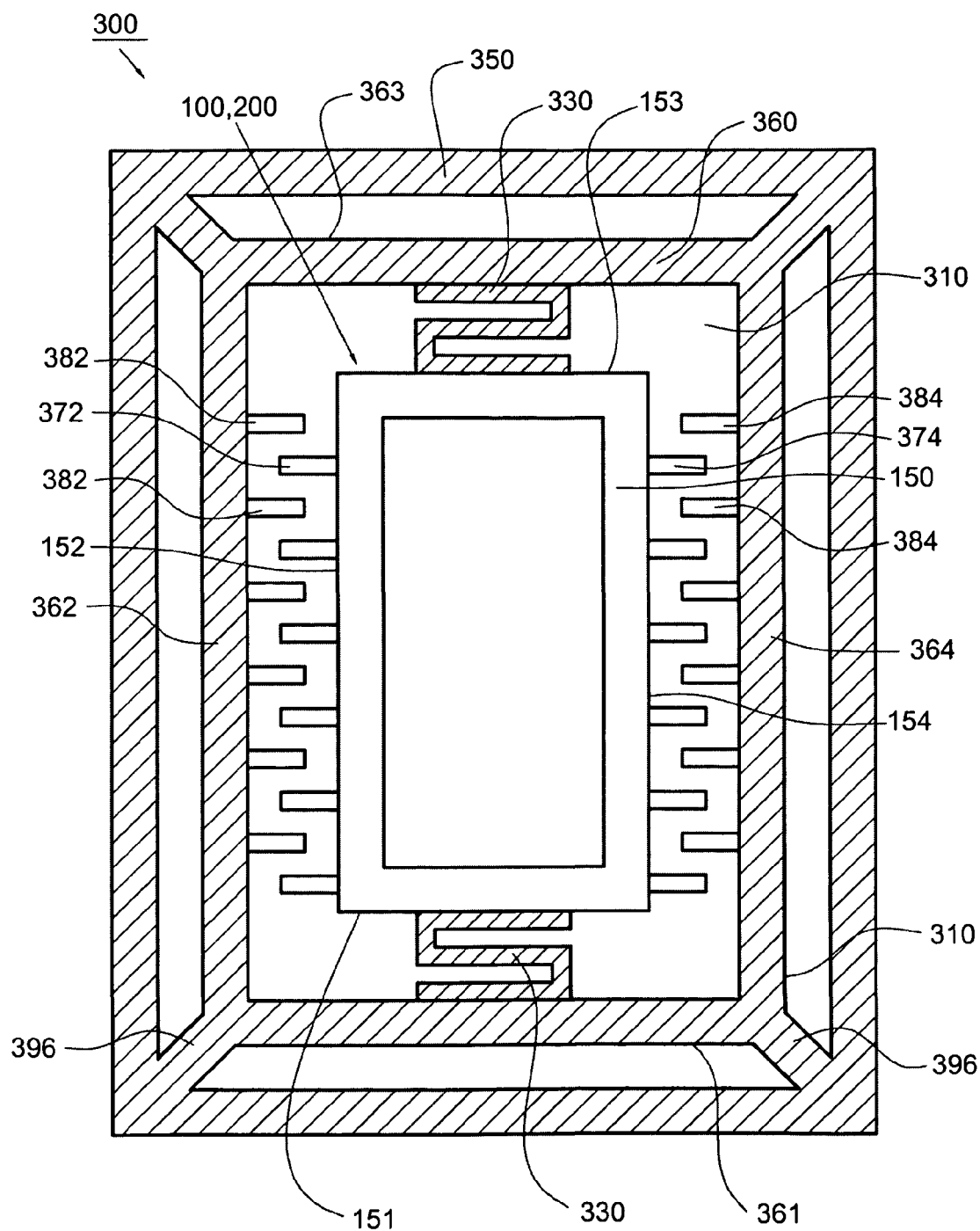
FIG. 3 is a schematic diagram illustrating a sensing device of the present invention that can measure the acceleration of two dimensions.

Referring to FIG. 3, the out-of-plane sensing device 300 of the present invention is designed to include the out-of-sensing device 100 or 200 to measure two-dimensional acceleration. The sensing device 300 includes a substrate 350, the sensing device 100 or 200 and two springs 330. A substantially rectangular frame 360 is positioned on the substrate 350 and encloses a receiving space 310. The sensing device 100 or 200 is positioned in the receiving space 310 and movable parallel to the substrate 350. One of the two springs 330 is connected between one longitudinal side 151 of the substrate 150 and one longitudinal side 361 of the frame 360 and the other spring 330 is connected between the other longitudinal side 153 of the substrate 150 and the other longitudinal side 363 of the frame 360 so that the springs 330 will exert a force on the sensing device 100 or 200 to make the sensing device 100 or 200 move back to its equilibrium position when the sensing device 100 or 200 moves parallel to the substrate 350 as a result of subjection to an external force. In addition, four anchors 396 are connected to the four corners of the rectangular frame 360 respectively and are rigidly coupled to the substrate 350 to reduce the warpage of the frame 360 resulted from residual stress.

In order to measure the acceleration of the sensing device 300, a plurality of electrodes 372 extends perpendicularly away from one transverse side 152 of the substrate 150 toward one transverse side 362 of the frame 360. A plurality of electrodes 374 extends perpendicularly away from the other transverse side 154 of the substrate 150 toward the other transverse side 364 of the frame 360. A plurality of electrodes 382 extends perpendicularly away from the transverse side 362 of the frame 360 toward the transverse side 152 of the substrate 150 and is interleaved with the electrodes 372. A plurality of electrodes 384 extends perpendicularly away from the transverse side 364 of the frame 360 toward the transverse side 154 of the substrate 150 and is interleaved with the electrodes 374. In operation, when the sensing device 300 is accelerated to cause the sensing device 100 or 200 to move parallel to the substrate 350, the electrodes 372 and 374 will move relative to the electrodes 382 and 384 respectively, thereby varying the distance, and hence the capacitance between the electrodes 372, 374 and the electrodes 382, 384 respectively. The variation of the capacitance between the electrodes 372, 374 and the electrodes 382, 384 can be used to determine the acceleration of the sensing device 300 parallel to the substrate 350.

The sensing device 300 of the present invention can measure the acceleration of one dimension by the sensing device 100 or 200. Moreover, since the whole sensing devices 100, 200 can move parallel to the substrate 350 and therefore be deemed as a proof mass as shown in the figure, the sensing device 300 can also measure the acceleration of another dimension. Accordingly, the sensing device 300 of the present invention can measure the acceleration of at least two dimensions.

Figure 4:
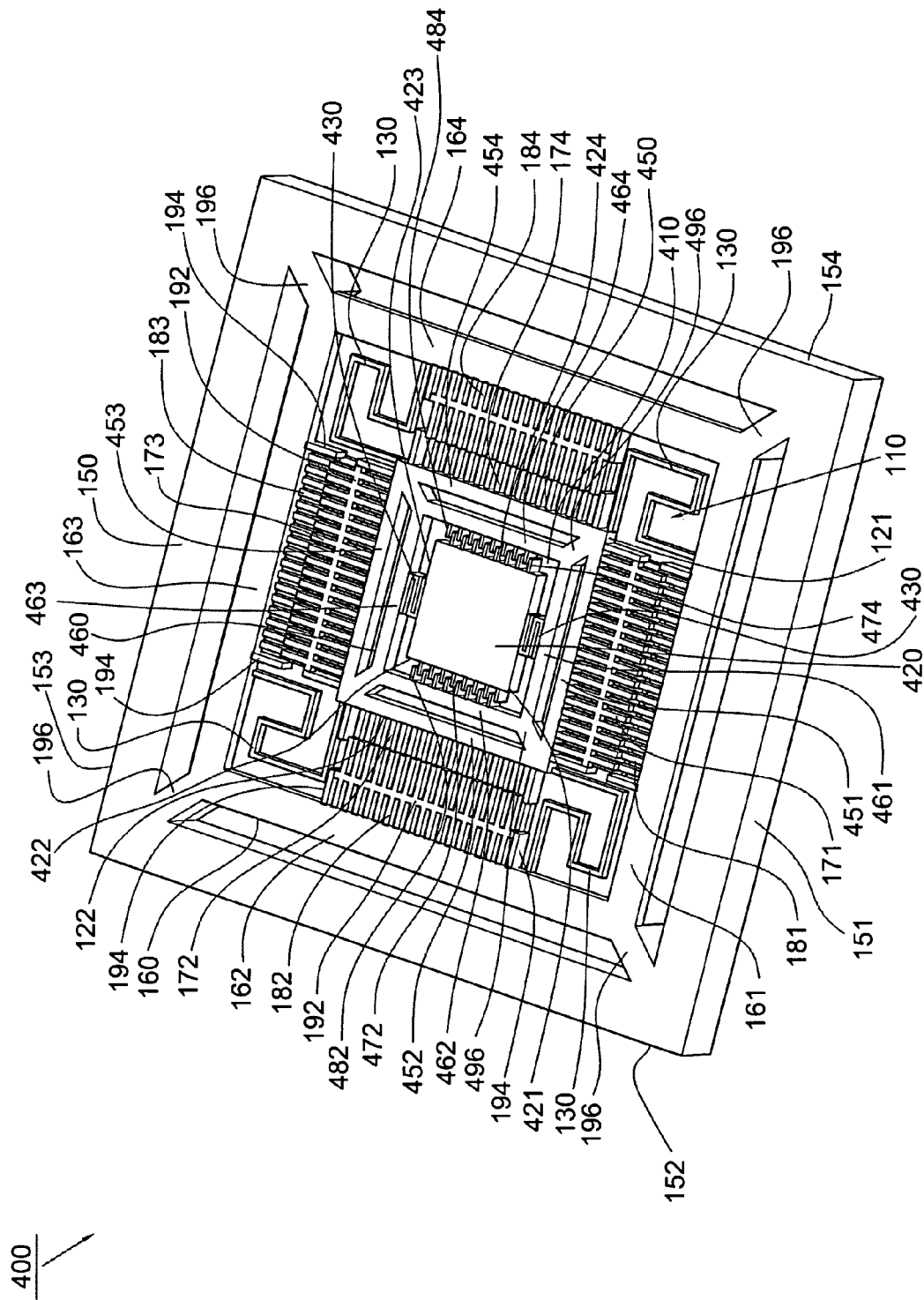
FIG. 4 is a schematic diagram illustrating another sensing device of the present invention that can measure the acceleration of two dimensions.

Referring to FIG. 4, the out-of-plane sensing device 100 of the present invention can be designed as another sensing device 400 to measure the acceleration of two dimensions. The out-of-plane sensing device 400 is substantially identical to the out-of-plane sensing device 100 and the differences between them are in that the proof mass 120 in the sensing device 100 is replaced with a structure similar to the sensing device 300. More specifically, in comparison with the sensing device 100, the sensing device 400 further includes a substantially rectangular substrate 450, a proof mass 420 and two springs 430. A substantially rectangular frame 460 is positioned on the substrate 450 and encloses a receiving space 410. The proof mass 420 is positioned in the receiving space 410 and movable parallel to the substrate 450. One of the two springs 430 is connected between one longitudinal side 461 of the frame 460 and one longitudinal side 421 of the proof mass 420, and the other spring 430 is connected between the other longitudinal side 463 of the frame 460 and the other longitudinal side 423 of the proof mass 420 so that the springs 430 will exert a force on the proof mass 420 to make the proof mass 420 move back to its equilibrium position when the proof mass 420 moves parallel to the substrate 450 as a result of subjection to an external force. In addition, four anchors 496 are connected to the four corners of the rectangular frame 460 respectively and are rigidly coupled to the substrate 450 to reduce the warpage of the frame 460 resulted from residual stress.

In order to measure the acceleration of the sensing device 400, a plurality of electrodes 472 extends perpendicularly away from one transverse side 422 of the proof mass 420 toward one transverse side 462 of the frame 460. A plurality of electrodes 474 extends perpendicularly away from the other transverse side 424 of the proof mass 420 toward the other transverse side 464 of the frame 460. A plurality of electrodes 482 extends perpendicularly away from the transverse 462 of the frame 460 toward the transverse side 422 of the proof mass 420 and is interleaved with the electrodes 472. A plurality of electrodes 484 extends perpendicularly away from the transverse 464 of the frame 460 toward the transverse side 424 of the proof mass 420 and is interleaved with the electrodes 474. In operation, when the sensing device 400 is accelerated to cause the proof mass 420 to move parallel to the substrate 450, the electrodes 472 and 474 will move relative to the electrodes 482 and 484 respectively, thereby varying the distance, and hence the capacitance between the electrodes 472, 474 and the electrodes 482, 484 respectively. The variation of the capacitance between the electrodes 472, 474 and the electrodes 482, 484 can be used to determine the acceleration of the sensing device 400 parallel to the substrate 450.

Moreover, in the sensing device 400, the electrode 171 extends perpendicularly away from one longitudinal side 451 of the substrate 450 toward the longitudinal side 161 of the frame 160. The electrode 173 extends away from the other longitudinal side 453 of the substrate 450 toward the longitudinal side 163 of the frame 160. The electrode 172 extends away from one transverse side 452 of the substrate 450 toward the transverse side 162 of the frame 160. The electrode 174 extends away from the other transverse side 454 of the substrate 450 toward the transverse side 164 of the frame 160. In addition, the out-of-plane sensing device 400 preferably also includes four springs 130, wherein the first of the four springs 130 is connected between the longitudinal side 161 of the frame 160 and the longitudinal side 451 of the substrate 450, the second of the four springs 130 is connected between the transverse side 162 of the frame 160 and the transverse side 452 of the substrate 450, the third of the four springs 130 is connected between the longitudinal side 163 of the frame 160 and the longitudinal side 453 of the substrate 450, and the fourth of the four springs 130 is connected between the transverse side 164 of the frame 160 and the transverse side 454 of the substrate 450. Since other elements in the sensing device 400 are the same as the elements in the sensing device 100, any further illustrations of the identical elements are omitted herein.

Similarly, when the sensing device 400 is accelerated to cause the substrate 450 to move perpendicularly to the substrate 150, the electrodes 171, 172, 173 and 174 extending from the substrate 450 will move relative to their respective counter electrodes 181, 182, 183 and 184 thereby varying the distance, and hence the capacitance between the electrodes 171, 172, 173, 174 and their respective counter electrodes 181, 182, 183, 184. The variation of the capacitance between the electrodes 171, 172, 173, 174 and their respective counter electrodes 181, 182, 183, 184 can be used to determine the acceleration of the sensing device 400 perpendicular to the substrate 150.

The sensing device 400 of the present invention can measure the acceleration parallel to the substrate 150. In addition, since the whole structure on the substrate 450 can move perpendicular to the substrate 150 and therefore be deemed as a proof mass as shown in the figure, the sensing device 400 can also measure the acceleration of another dimension. Accordingly, the sensing device 400 of the present invention can measure the acceleration of at least two dimensions.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An out-of-plane sensing device, comprising:
a first substrate;
a proof mass movable perpendicular to the first substrate;
a first frame positioned on the first substrate and enclosing the proof mass;
at least one first spring connecting the proof mass to the first frame;
a first electrode extending from a first side of the proof mass toward the first frame;
a first counter electrode extending from the first frame toward the proof mass, wherein a projection of the first electrode onto the first substrate overlaps with a projection of the first counter electrode onto the first substrate;
a second electrode extending from a second side of the proof mass toward the first frame; and
a second counter electrode extending from the first frame toward the proof mass, wherein a projection of the second electrode onto the first substrate overlaps with a projection of the second counter electrode onto the first substrate;
wherein a distance from the second electrode to the second counter electrode will increase when the proof mass moves to decrease a distance from the first electrode to the first counter electrode.

2. The out-of-plane sensing device as claimed in claim 1, wherein the proof mass further includes a third side opposing the first side, and a fourth side opposing the second side, the out-of-plane sensing device further comprises:
a third electrode extending from the third side of the proof mass toward the first frame; and
a third counter electrode extending from the first frame toward the proof mass, wherein a projection of the third electrode onto the first substrate overlaps with a projection of the third counter electrode onto the first substrate;
a fourth electrode extending from the fourth side of the proof mass toward the first frame; and a fourth counter electrode extending from the first frame toward the proof mass, wherein a projection of the fourth electrode onto the first substrate overlaps with a projection of the fourth counter electrode onto the first substrate; wherein a distance from the fourth electrode to the fourth counter electrode will increase when the proof mass moves to cause a distance from the third electrode to the third counter electrode decreases.

3. The out-of-plane sensing device as claimed in claim 2, wherein distances from the first and third electrodes to the first substrate are respectively greater than distances from the first and third counter electrodes to the first substrate, and distances from the second and fourth electrodes to the first substrate are respectively smaller than distances from the second and fourth counter electrodes to the first substrate.

4. The out-of-plane sensing device as claimed in claim 2, wherein the first, second, third, fourth electrodes and the first, second, third, fourth counter electrodes are comb-like electrodes.

5. The out-of-plane sensing device as claimed in claim 4, further comprising:
a plurality of arms, each having two opposing ends, wherein the electrodes of each of the first, second, third, fourth comb-like electrodes and the first, second, third, fourth comb-like counter electrodes are connected to each other by one of the plurality of arms.

6. The out-of-plane sensing device as claimed in claim 5, further comprising:
a plurality of reinforced ribs connecting to one of the ends of the arms, respectively.

7. The out-of-plane sensing device as claimed in claim 2, wherein the out-of-plane sensing device comprises four first springs which are connected to the first, second, third and fourth sides of the proof mass, respectively.

8. The out-of-plane sensing device as claimed in claim 2, wherein the proof mass is a rectangular proof mass, the first frame is a rectangular frame and the out-of-plane sensing device comprises four first springs, each of the four first springs is linear spring and is connected between one of the four corners of the first frame and one of the four corners of the proof mass.

9. The out-of-plane sensing device as claimed in claim 2 wherein the first frame is a rectangular frame, the out-of-plane sensing device further comprises:
four first anchors connected to the four corners of the first frame, respectively and rigidly coupled to the first substrate.

10. The out-of-plane sensing device as claimed in claim 2, further comprising:
a second substrate, wherein the first substrate is movable parallel to the second substrate;
a second frame positioned on the second substrate and enclosing the first substrate;
at least one second spring connecting the first substrate to the second frame;
a plurality of fifth electrodes extending from the first substrate toward the second frame; and
a plurality of sixth electrodes extending from the second frame toward the first substrate and interleaved with the plurality of fifth electrodes.

11. The out-of-plane sensing device as claimed in claim 10 wherein the second frame is a rectangular frame, the out-of-plane sensing device further comprises:
four second anchors connected to the four corners of the second frame, respectively and rigidly coupled to the second substrate.

12. An out-of-plane sensing device, comprising:
a first substrate;
a second substrate positioned over the first substrate and moveable perpendicular to the first substrate;
a proof mass movable parallel to the second substrate;
a second frame positioned on the second substrate and enclosing the proof mass;
a first frame positioned on the first substrate and enclosing the second substrate;
at least one first spring connecting the second substrate to the first frame;
at least one second spring connecting the proof mass to the second frame;
a first electrode extending from a first side of the second substrate toward the first frame;
a second electrode extending from the first frame toward the second substrate, wherein a projection of the first electrode onto the first substrate overlaps with a projection of the second electrode onto the first substrate;
a plurality of third electrodes extending from the second frame toward the proof mass;
a plurality of fourth electrodes extending from the proof mass toward the second frame and interleaved with the plurality of third electrodes,
wherein the plurality of third and fourth electrodes are configured to sense in-plane movement;
a fifth electrode extending from a second side of the second substrate toward the first frame; and
a sixth electrode extending from the first frame toward the second substrate, wherein a projection of the fifth electrode onto the first substrate overlaps with a projection of the sixth electrode onto the first substrate;
wherein a distance from the fifth electrode to the sixth electrode will increase when the second substrate moves to decrease a distance from the first electrode to the second electrode.

13. The out-of-plane sensing device as claimed in claim 12, wherein the second substrate further has a third side opposing the first side and a fourth side opposing the second side, the out-of-plane sensing device further comprises:
a seventh electrode extending from the third side of the second substrate toward the first frame
an eighth electrode extending from the first frame toward the second substrate, wherein a projection of the seventh electrode onto the first substrate overlaps with a projection of the eighth electrode onto the first substrate
a ninth electrode extending from the fourth side of the second substrate toward the first frame; and
a tenth electrode extending from the first frame toward the second substrate, wherein a projection of the ninth electrode onto the first substrate overlaps with a projection of the tenth electrode onto the first substrate;
wherein a distance from the ninth electrode to the tenth electrode will increase when the second substrate moves to decrease a distance from the seventh electrode to the eighth electrode.

14. The out-of-plane sensing device as claimed in claim 13, wherein distances from the first and seventh electrodes to the first substrate are respectively greater than distances from the second and eighth electrodes to the first substrate, and distances from the fifth and ninth electrodes to the first substrate are respectively smaller than distances from the sixth and tenth electrodes to the first substrate.

15. The out-of-plane sensing device as claimed in claim 13, wherein the first, second, fifth, sixth, seventh, eighth, ninth, and tenth electrodes are comb-like electrodes.

16. The out-of-plane sensing device as claimed in claim 15, further comprising:
a plurality of arms, each having two opposing ends, wherein the electrodes of each of the first, second, fifth, sixth, seventh, eighth, ninth, and tenth comb-like electrodes are connected to each other by one of the plurality of arms.

17. The out-of-plane sensing device as claimed in claim 16, further comprising:
a plurality of reinforced ribs connecting to one of the ends of the plurality of arms, respectively.

18. The out-of-plane sensing device as claimed in claim 13, wherein the out-of-plane sensing device comprises four first springs which are connected to the first, second, third and fourth sides of the second substrate, respectively.

19. The out-of-plane sensing device as claimed in claim 13 wherein the first frame is a rectangular frame, the out-of-plane sensing device further comprises:
four first anchors connected to the four corners of the first frame, respectively and rigidly coupled to the first substrate.

20. The out-of-plane sensing device as claimed in claim 13 wherein the second frame is a rectangular frame, the out-of-plane sensing device further comprises:
four second anchors connected to the four corners of the second frame, respectively and rigidly coupled to the second substrate.

* * * * *